(No Model.)
J. L. BLACK.
VALVE.
No. 605,693. Patented June 14, 1898.
Fig. I. 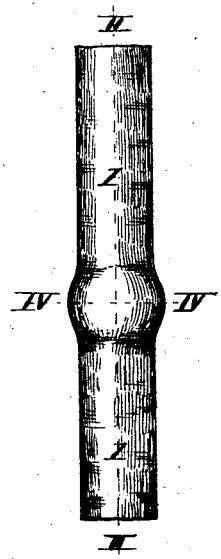  Fig. II.   Fig. III. 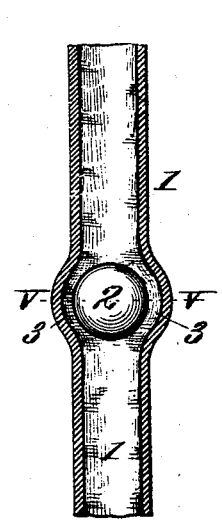
Fig. IV. 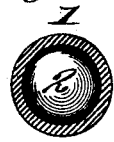  Fig. V. 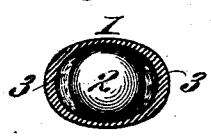
Attest:
E. S. Knight
Stanley Stoner
Inventor,
John L. Black.
By Knight Bro
Atty's

UNITED STATES PATENT OFFICE.

JOHN L. BLACK, OF ST. LOUIS, MISSOURI, ASSIGNOR TO THE BLACK MANUFACTURING COMPANY, OF SAME PLACE.

VALVE.

SPECIFICATION forming part of Letters Patent No. 605,693, dated June 14, 1898.

Application filed October 11, 1897. Serial No. 654,735. (No model.)

*To all whom it may concern:*

Be it known that I, JOHN L. BLACK, a citizen of the United States, residing at the city of St. Louis, in the State of Missouri, have invented a certain new and useful Improvement in Valves, of which the following is a full, clear, and exact description, reference being had to the accompanying drawings, forming part of this specification.

My invention has for its object the construction of a valve adapted for use where there is but a slight pressure exercised on either side thereof and which will permit the passage of a fluid in either direction. I accomplish my purpose by means of the device illustrated in the accompanying drawings, in which—

Figure I shows a side elevation of the exterior of the tubing. Fig. II is a longitudinal sectional view taken along the line II II of Fig. I. Fig. III is a longitudinal sectional view similar to that shown in Fig. II, but taken at right angles thereto or through the line III III of Fig. II. Fig. IV is a cross-section taken along the line IV IV of Fig. I. Fig. V is a cross-section taken along the line V V of Fig. III.

The essential feature of my invention consists in inserting in a flexible tube 1 a hard spherical body 2, which is of sufficient diameter to snugly fill the interior of the said tube. This tube is preferably constructed of rubber, but may be of canvas or other suitable material. The ball 2 may be an ordinary bullet or any body adapted to fill and slightly distend the tube. It is practicable, but not so convenient, to use a cylindrical instead of a spherical body.

The ball 2, filling and slightly distending the tube 1, forms an effectual barrier to resist the pressure in either direction of a fluid, either air or a liquid, through the said tube. To enable one to use the same as a valve, I apply pressure to the exterior of the tube on opposite sides of the ball 2, which causes the area of the tubing between the points of pressure to distend, as is shown in Figs. III and V. This, it will be seen, leaves a passage-way 3 between the walls of the tube 1 and the ball 2 to permit the passage of a fluid therethrough. By releasing the said pressure the walls again assume the position shown in Figs. I, II, and IV and seal the passage.

The pressure of the fingers is best adapted to operate the device, but any other means may be employed, as all that is necessary is to produce thereby the open passage-ways 3 between the walls of the tube and the inserted ball.

The device is so exceedingly simple that the cost for manufacture or repair is reduced to a minimum. It is adapted for use on apparatus where a slight pressure is exercised and where small volumes of fluid are manipulated. It will be observed also that it is adapted to allow passage in either direction.

I claim as my invention, in an improvement in valves, and desire to secure by Letters Patent—

The combination consisting of a flexible tube, and a solid spherical body 2, said body 2 being of somewhat greater diameter than the interior of said tube, and adapted to close said interior, but to permit passage therethrough upon pressure being applied to opposite external sides of said tube, substantially as described.

JOHN L. BLACK.

In presence of—
  E. S. KNIGHT,
  STANLEY STONER.